United States Patent [19]

Stebe

[11] 3,914,791

[45] Oct. 21, 1975

[54] MEMORY UNIT FLYING PAD LINKAGE

[75] Inventor: Robert F. Stebe, Thousand Oaks, Calif.

[73] Assignee: VRC California, Inc., El Segundo, Calif.

[22] Filed: Jan. 28, 1974

[21] Appl. No.: 437,181

[52] U.S. Cl. .................... 360/103; 360/77; 360/86; 360/97; 360/105

[51] Int. Cl.² ........................ G11B 5/60; G11B 5/54; G11B 21/12

[58] Field of Search ........... 360/103, 102, 105, 106, 360/109, 75, 77–78, 72, 97–99

[56] References Cited

UNITED STATES PATENTS

| | | | |
|---|---|---|---|
| 3,034,111 | 5/1962 | Hoagland et al. | 360/77 |
| 3,245,063 | 4/1966 | Cheney et al. | 360/103 |
| 3,298,009 | 1/1967 | Domich et al. | 360/78 |
| 3,634,836 | 1/1972 | Huetten et al. | 360/98 |
| 3,643,242 | 2/1972 | Bryer | 360/105 |

OTHER PUBLICATIONS

IBM Technical Disclosure Bulletin, J. R. Evans et al., High-Performance Storage Device, Vol. 14, No. 7, December 1971, p. 2206.

*Primary Examiner*—Alfred H. Eddleman
*Attorney, Agent, or Firm*—Fraser and Bogucki

[57] ABSTRACT

A disc drive information storage unit is disclosed having a fixed operative position head mount coupled flying pad and a linear motor responsive reciprocative head mount coupled flying pad and in which both the reciprocative flying pad and the fixed flying pad are landed, positioned and unlanded by a lateral and vertical movement with respect to a medium and the fixed flying pad is landed and positioned or unlanded in response to a landing or unlanding motion, respectively, of the reciprocative head mount. A linkage includes a pivotally base coupled reciprocative head mount responsive first element coupled to a pivotally base coupled fixed head mount motion imparting second element. The fixed head mount is biased towards the medium by a constant force spring while a stop element limits the travel of the fixed head mount and coupled flying pad beyond an operative position. In operation, a landing directed motion of the reciprocative head mount allows a rotation of the first element, a counter rotation of the second element and a landing and operative positioning of the fixed flying pad as biased by the spring and limited by the stop element. An unlanding motion of the reciprocative head mount induces an opposite rotation and counter rotation of the first and second elements and unlands the fixed flying pad.

9 Claims, 5 Drawing Figures

MEMORY UNIT FLYING PAD LINKAGE

BACKGROUND OF THE INVENTION

1. Field of the Invention

This invention relates to information storage units and more particularly to magnetic storage unit flying pad landing, positioning and unlanding systems.

2. Description of the Prior Art

Reciprocative flying pads are used in magnetic information storage units to achieve relatively rapid access of information. One or more flying pads are typically coupled to a head mount which may be moved by a linear motor to position the flying pad over a desired track of a multitrack medium. The track access time, or the time that it takes to position the flying pad over a particular track, is a limiting factor in quickly accessing a particular information record and lessens the desirability of reciprocative flying pad systems. Yet, such systems are desirable for their relatively low cost resulting from the ability of a single flying pad moving in a reciprocative manner to read or record a large number of tracks.

Another type of magnetic information storage unit utilizes a plurality of heads, each head having a single or fixed operative position over a particular track. Such head-per-track systems as they are known in the art provide rapid access to information records since track accessing is accomplished electronically by selecting and coupling the proper circuitry to the head corresponding to the particular desired track. Thus, the time required for a linear motor to mechanically position a reciprocative flying pad over a particular track is eliminated. The head-per-track systems are costly as compared to reciprocative flying pad systems and are therefore not desirable unless rapid access is of importance.

In the operation of a typical magnetic information storage unit, a magnetic media such as a magnetic disc rotates at a high speed and flying pads which read and record on the surface of the disc ride above the surface on a thin cushion of air. The cushion of air is necessary to prevent the magnetic heads from contacting the magnetic surface. Any such contact could cause what is known as head crash in which the metal oxide surface is quickly scraped away, thereby destroying data and requiring costly maintenance and down time. The cushion of air between the flying pads and the magnetic disc surface is created by the rotation of the disc. It is desirable that the heads be removed away from the disc surface if the rotation slows, the disc motor is shut off or in the event of a power failure. Thus, the typical system includes means for unlanding or removing the flying pads from the disc surface. The unlanding may be a normal or perpendicular movement of the flying pad from the disc surface or a lateral movement of flying pads in which the flying pads are also removed radially or transversely from the disc surface or a combination of normal and lateral movements.

Various types of landing and unlanding mechanisms have been used in the past, and have commonly included such systems as ramp landing and cam landing. Ramp systems typically include an arm coupling a flying pad to a head mount. The arm bears on a fixed reference such that as the inclined surface of the arm is moved over the fixed reference, the arm and hence the flying pad will be raised or lowered with respect to the disc surface. Such a landing system is advantageous in that it merely requires a horizontal motion of the arm to achieve both a vertical and a lateral landing of the heads. A single linear motor may be typically coupled directly to the head mount to provide the horizontal motion, both for landing, unlanding and operatively positioning the flying pad.

In cam systems, the flying pads, positioned vertically over the surface of the media, are landed by directly bringing the heads closer in a normal direction to the media surface. A cam might be an elongated element having a protruding portion which is moved laterally across a reference on the flying pad while the lateral position of the flying pad remains generally fixed. The protruding portion of the cam bearing on the reference urges the flying pad toward the disc, landing the flying pad while a retraction of the protruding portion of the cam allows the flying pad to be uplifted from the disc unlanding the flying pad.

In some fixed head or head-per-track systems, a stream of air is used to engage a number of pistons which individually move the flying pads toward the disc surface. In other systems, a master actuator or solenoid may move a single rod which in turn drives a plurality of rods to bear on individual cams for landing or unlanding the flying pads onto a disc surface. A still further landing scheme involves a cluster of heads mounted on an elongated structure which is rotated about its axis causing the heads to be lowered and be brought into proximity of the magnetic surface. One system having a plurality of reciprocative or moving heads and a fixed clock head for accessing a multi-disc pack employes a rather complex system in which the moving heads having protruding portions are joined to a reciprocative bar and are landed by the bearing on the protruding portions of a plurality of inclined surfaces on elongated elements which are joined to a tie bar. As the reciprocative bar is retracted, an interposer limits the travel of the tie bar and the movement of the tie bar with respect to the reciprocative bar causes the inclined surfaces to bear on the protruding portions and causes the heads to be lowered onto the disc surfaces. A fixed operative position clock head, in proximity with an independently coupled bar having an inclined surface, lands in response to a landing movement of the reciprocative bar. An interposer is engaged causing the movement of the reciprocative bar to drive a bell crank and in turn cause the independently coupled bar to pass the inclined surfaces by the protruding portion, landing the clock head. The unlanding of the reciprocative heads are accomplished by deenergizing a solenoid which allows the tie bar to move with respect to the reciprocative bar while the unlanding of the clock head is accomplished separately by the releasing of a scissors clamp engaged by a solenoid. The aforementioned schemes are generally complex and costly.

Thus it would be desirable to have a magnetic information storage system which combines the advantages of low cost inherent in a reciprocative flying pad system with rapid access times inherent in a head-per-track system and still provide a landing and unlanding system achieving simplicity, high reliability and low cost.

SUMMARY OF THE INVENTION

The information storage unit of this invention generally comprises a first head mount for landing and unlanding first flying pad means over a media, a second head mount for landing, positioning and unlanding second flying pad means over the media, the second head mount being spatially separated from the first head mount and linkage means coupled to the second head mount and responsive to the first head mount for causing the second head mount to land, position and unland the second flying pad means in response to a landing or unlanding directed motion respectively of the first head mount.

In a more specific example, a first head mount coupled to a linear motor supports a first flying pad for landing and unlanding the flying pad and for moving the flying pad over particular selectable tracks of a multitrack region of the media. A second head mount supports a second flying pad for landing and unlanding a second flying pad and for directing the flying pad over a fixed operative location on the media. A linkage means comprises spatially separated first and second elements pivotally coupled to the base. The first element rotates in response to a movement of limited travel of the first head mount for imparting a motion to the second element, while the second element rotating in response to the first element imparts a linear movement to the second head mount for landing and positioning or unlanding the second flying pad means in accordance with a landing or unlanding motion, respectively of the first head mount. A spring biases the second head mount towards the fixed operative location while stop means limits the travel of the second head mount to prevent the second flying pad means from traveling beyond the fixed operative location.

Ramp means are generally provided for raising and lowering the first and second flying pad means normally with respect to the disc surface. In some embodiments, a staggered landing order of the first and second head mounts is defined for reducing the power requirements of the linear motor.

In another example, the first element comprises a rod pivotally disposed through the base separating first and second elongated members, the first elongated member having a notched surface for receiving the first head mount and the second elongated member having a pin for imparting a motion to the second element. The second element is nominally perpendicular to the second member for imparting a motion to the head mount. The second head mount may be supported by a table slidably movable along a plurality of bearings while the stop means includes a reference plate and an adjustable eccentric element coupled to the table for varying the location over which the second flying pad means operates.

DETAILED DESCRIPTION

Figure 1:
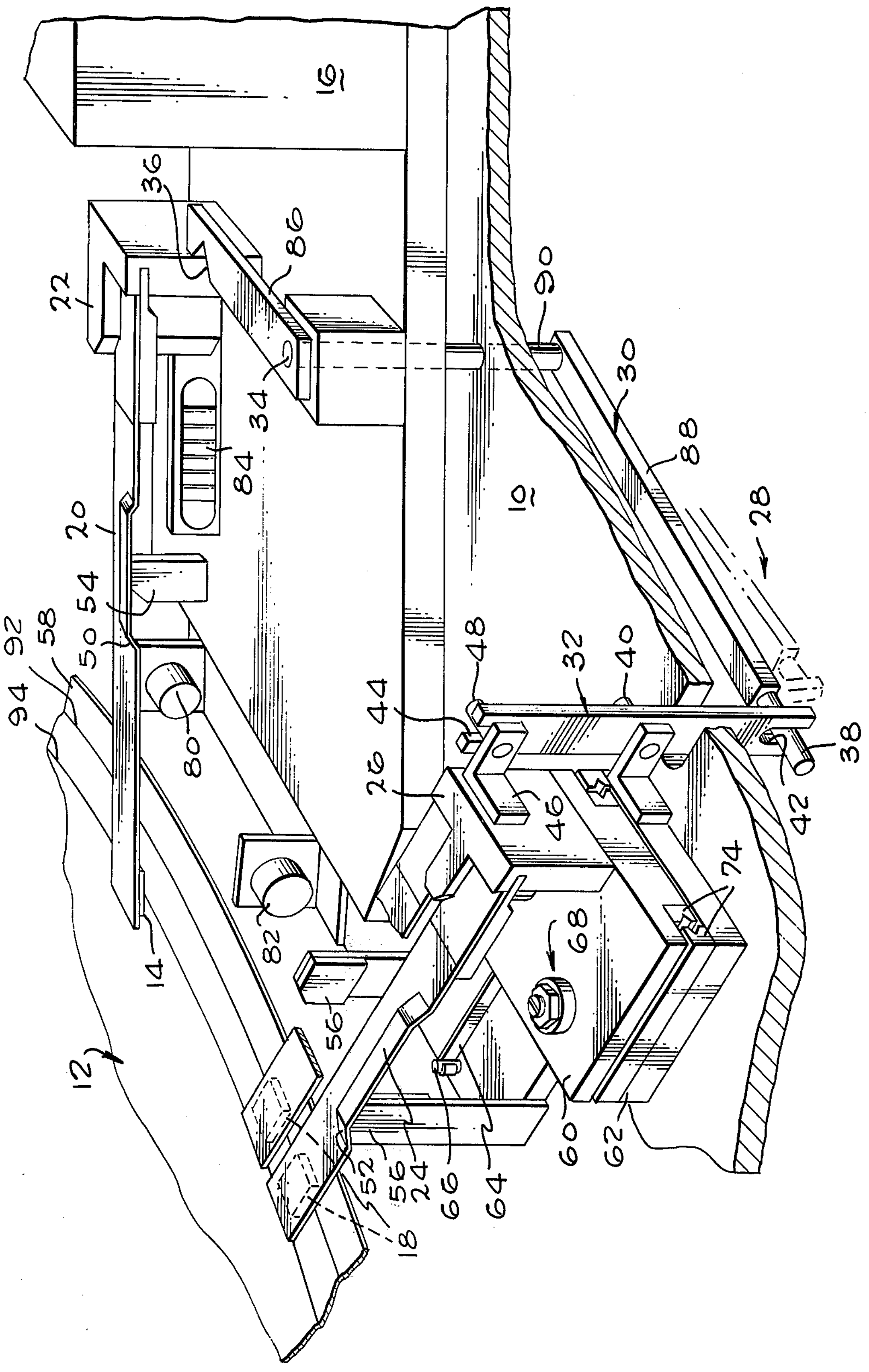
FIG. 1 is a perspective view of a preferred embodiment of the landing, positioning and unlanding system of an information storage unit in accordance with this invention.

With reference to FIGS. 1, 2, 3, and 4, a preferred embodiment of this invention generally comprises a base 10 of an information storage unit such as a random access disc memory system, having a medium 12 such as a magnetic disc surface movable with respect to a plurality of flying pads. A moving flying pad 14 slidably mounted with respect to the base 10 is coupled to a linear motor 16. The moving flying pad 14 may access a particular one of a plurality of tracks by being positioned over the particular track by the linear motor 16. Only one flying pad is shown, though it may be advantageous in certain systems to use a plurality of moving flying pads 14 coupled to the same linear motor 16.

Figure 3:
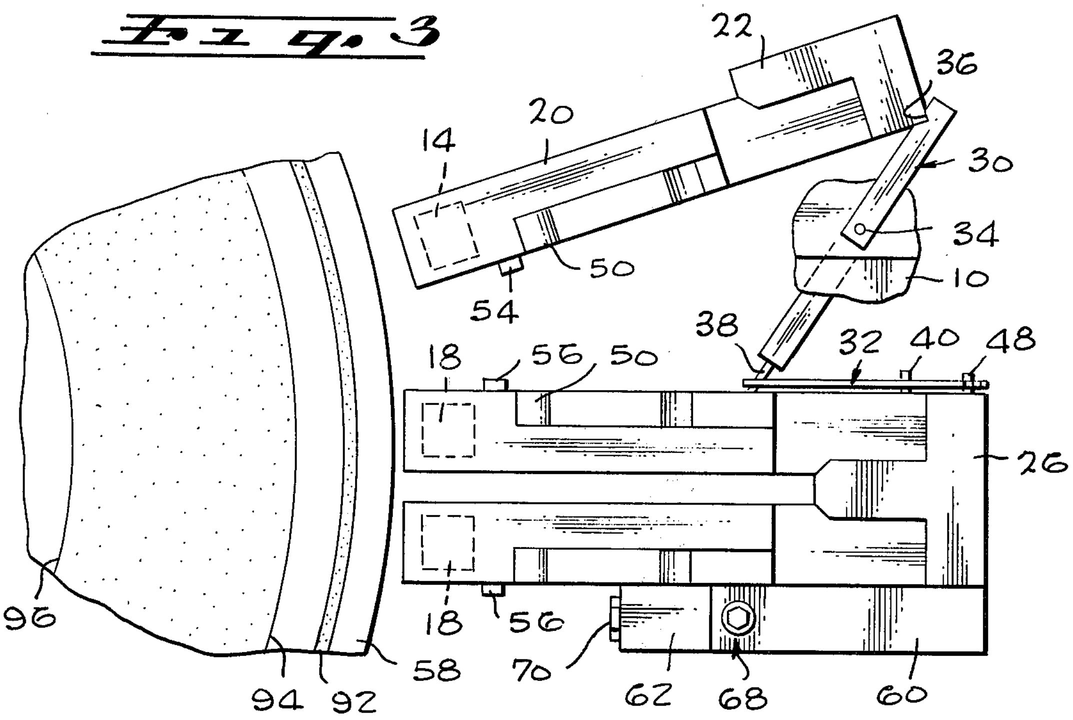
FIG. 3 is a plan view of the embodiment depicted in FIG. 1 showing the first and second flying pad means in an unlanded position.
Figure 4:
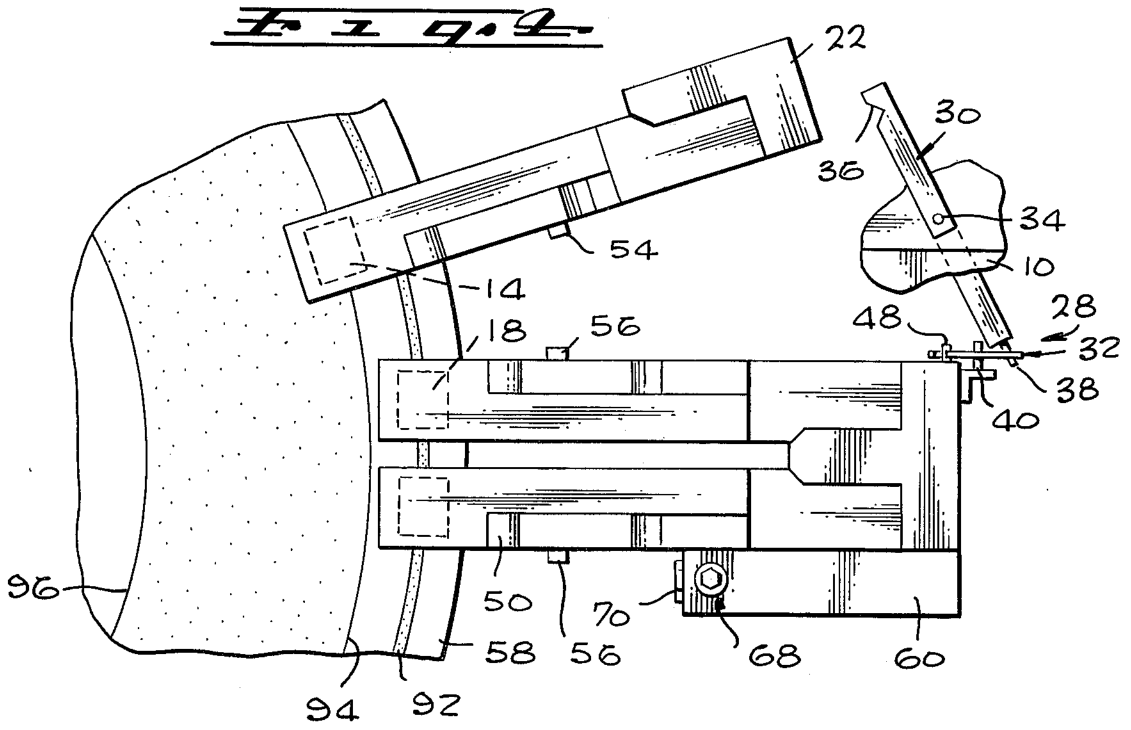
FIG. 4 is a plan view of the embodiment depicted in FIG. 1 showing the first and second flying pad means in a landed and operative position; and, FIG. 5 is a plan view of another preferred embodiment of this invention showing the first and second flying pad means in a landed position, and showing the first and second flying pad means in phantom in an unlanded position and showing the first flying pad means in phantom in an operative position.
Figure 5:
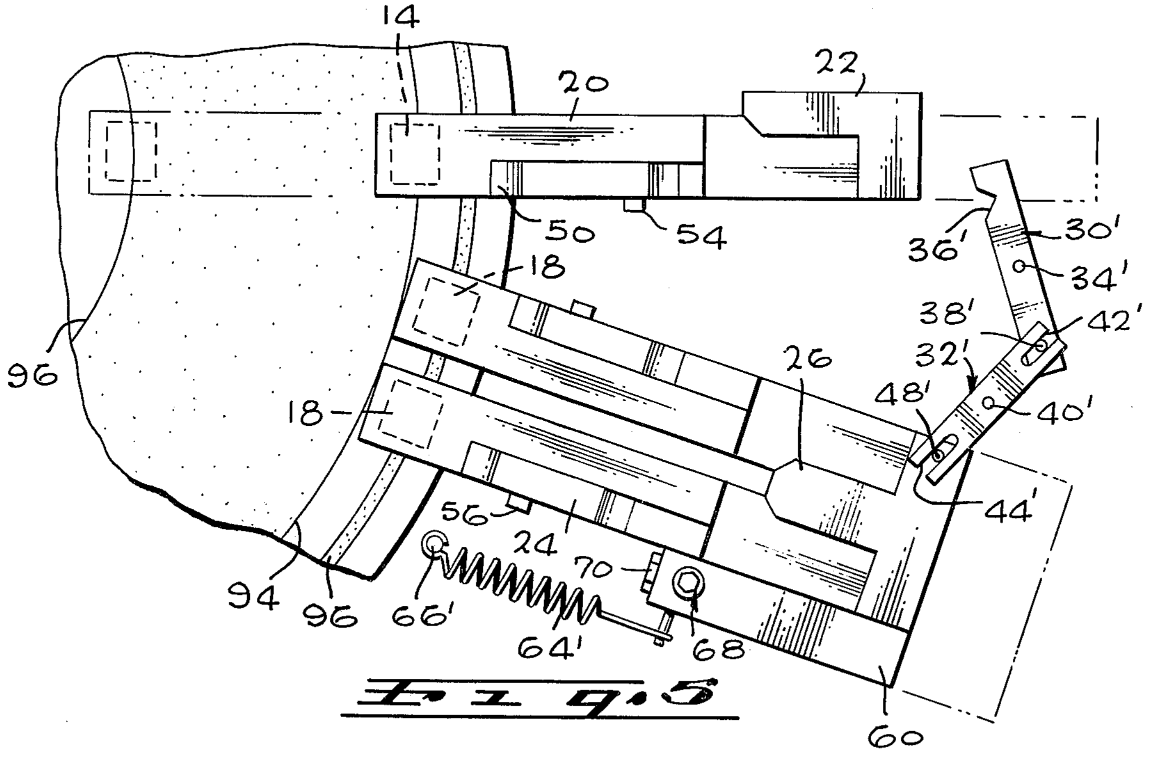

A fixed flying pad 18 spatially separated from the moving flying pad 14 has a fixed operative position and is slidably coupled to the base 10. Generally, the flying pad 18 has a plurality of head gaps which when in the operative position ride over an associated group of tracks on the media. The flying pad 18 is fixed in the sense that no physical movement of the flying pad 18 is required to access any particular track of the group. Access of a particular track is accomplished electronically by coupling appropriate read or record circuits to a particular head gap of the flying pad 18 corresponding to the desired track, as is known in the art of head-per-track systems. For clarity, only one flying pad 14 is shown in FIG. 1, though it is often desirable to have several fixed flying pads 18 (as shown in FIGS. 3, 4, 5) coupled to the base, each having a plurality of head gaps, such as on the order of 10, on each flying pad 18. One of the flying pads 18 may be used to read clocking information.

The moving flying pad 14 provides random access to records on a large number of tracks such as on the order of 1000 while the fixed flying pad 18 provides a higher speed random access to a limited number of tracks such as on the order of 30. The moving flying pad 14 must physically move to a desired track to access that particular track while the fixed flying pad 18, already having a head positioned over the desired track, need only be accessed by electronic head selection. Ideally, then, information which is frequently needed is recorded on the tracks over which the fixed flying pad 18 rides while information which is less frequently utilized is stored on the portions of the media over which the moving flying pad 14 may travel. Thus an optimal combination is obtained in which the advantages of relatively low cost of a moving flying pad system is combined with the relatively high speed of accessing in a head-per-track system where records are desired to be accessed with great frequency. The number of tracks accessible by the moving flying pad 14 and the number of tracks accessible by the fixed flying pad 18 may be varied to suit the requirements of the particular information storage unit.

The moving flying pad 14 is coupled by an arm 20 to a reciprocative or moving head mount 22. Similarly, fixed flying pad 18 is coupled by an arm 24 to a fixed head mount 26. The arms 20, 24 flexibly support the flying pads 14, 18 for travel over the medium 12 while the head mounts 22, 26 are for supporting and imparting motion to the arms 20, 24. The head mount 22 couples the moving flying pad 14 to the linear motor 16.

A linkage means 28 is coupled to the base 10 for imparting a motion to the head mount 26 in response to a motion of the head mount 22. The linkage means 28 generally comprises a first element 30 and a second element 32. The first element 30 is pivotally coupled to the base at a pivot 34 and has a notched surface 36 for receiving the head mount 22. The notched surface 36 provides for a reduction of space requirements of the system by allowing a greater retraction of the head mount with respect to a housing of the linear motor 16. A pin 38 extends from element 30 for imparting a motion to the second element 32.

The second element 32 is pivotally coupled to a bracket extending from the base 10 at a pivot 40 and, in this preferred embodiment, rotates in a plane perpendicular to a plane of rotation of the first element 30. A slot 42 is for receiving the pin 38 for rotating the second element 32 in response to a rotation of the first element 30, while a slot 44 on the element 32 is for imparting a motion to the head mount 26.

A bracket 46 is coupled to the head mount 26 and comprises a pin 48 coupled to an extending portion of the bracket 46. The pin 48 is disposed within the slot 44.

The arm 20 comprises a ramp 50 while the arm 24 comprises a ramp 52. A cam tower 54 is coupled to the base 10 and is disposed such that the arm 20 rests thereupon. Similarly, a cam tower 56 coupled to the base 10 is disposed such that the arm 24 rests thereupon. The ramps 50, 52 are disposed with respect to the cam towers 54, 56 so as to move the flying pads 14, 18 normally with respect to the disc surface for landing the flying pads within a landing zone 58.

In the preferred embodiment, the fixed flying pad 18 is landed and moved into an operative position after which the moving flying pad 14 is landed and moved into an operative position. This may be accomplished by advancing the positioning of the fixed head mount 26 with respect to the moving head mount 22 or adjusting the geometry of the linkage means 28. The staggered landing and unlanding reduces the necessary power requirements of the linear motor 16. The moving head mount 22 and the linear motor 16 are independent of the linkage means 28 and the fixed head mount when the moving head mount 22 is in an operative position.

The head mount 26 is attached to a table 60 which rides on a support 62 affixed to the base 10. A coiled constant force tension spring 64 biases the table 60 towards the medium 12 and is coupled between the table 60 and a reference 66 on the base 10.

Figure 2:
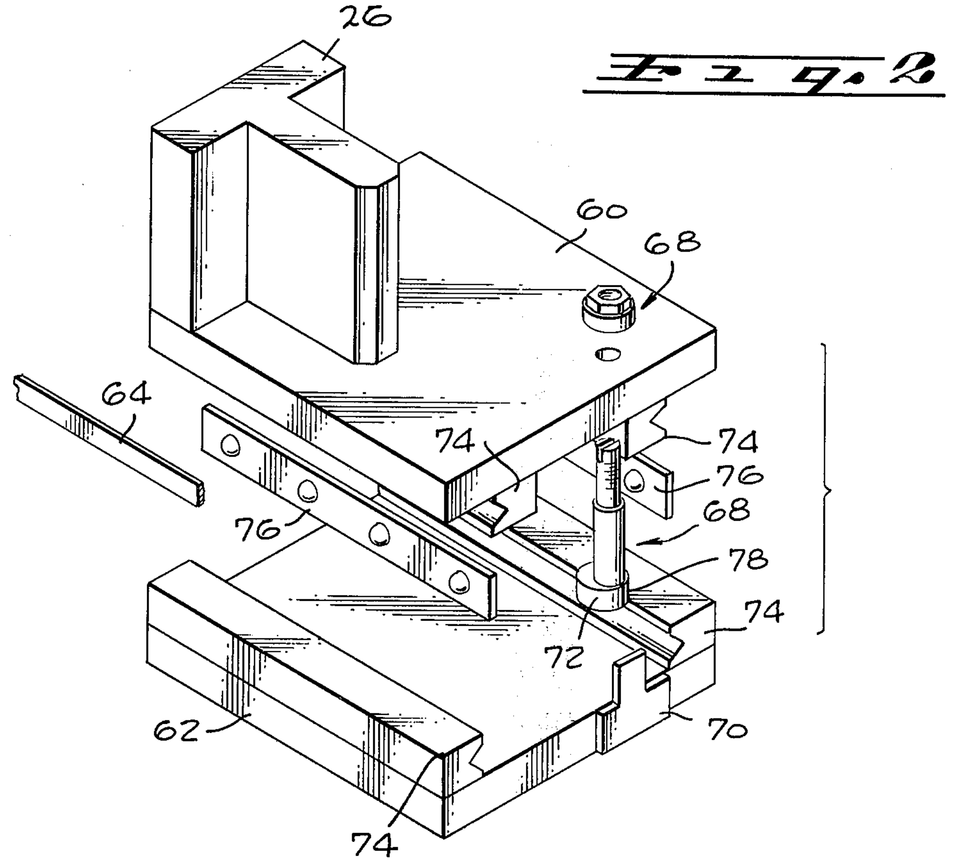
FIG. 2 is an assembly view of the table and the stop means of the embodiment depicted in FIG. 1.

A stop means 68 includes a stop element on a plate 70 extending from the base 10 and an adjustable eccentric element 72 coupled to the table for adjustably limiting the travel of the head mount 26 for adjusting the operating position of the fixed flying pad 18. FIG. 2 depicts in detail the adjustable stop means 68 of the embodiment of FIG. 1. The table 60 is shown resting on bearing ways 74 which support a plurality of roller bearings 76 for slidably mounting the table 60 to the support 62. The adjustable eccentric element 72 extends through the table 60 when assembled. Travel of the head mount 26 is limited by the plate 70 bearing on a circumferential surface 78 of the adjustable eccentric element.

A positioning system for the moving flying pad 14 comprises a lamp 80, photocell 82 and a reticle 84 as is known in the prior art. As lines of the reticle 84 pass between the lamp 80 and photocell 82, a signal is generated corresponding to the location of the moving flying pad 14 with respect to tracks of the medium 12. The signal is processed and the positioning system is coupled to the linear motor 16 to move the flying pad 14 to a desired track.

In the preferred embodiment of FIG. 1, the first element 30 of the linkage means 28 further comprises first and second members 86, 88 spatially separated by a rod 90. The rod 90 pivotably couples the element 30 to the base while the first member includes the notched surface 36 for bearing on the head mount 22, while the second member includes the pin 38.

Referring now to FIG. 5, another preferred embodiment of this invention differs from the embodiment depicted in FIGS. 1, 2, 3, and 4 in that a first element 30′ and a second element 32′ generally rotate within the same plane or parallel planes rather than in perpendicular planes. The fixed flying pad 18 and the head mount 26 are shown in the operative position over electronically accessible tracks 92 while the location of the flying pad 18 and head mount 26 in an unlanded position is indicated in phantom. The moving flying pad 14 is shown in a landed operative position over an outermost reciprocative access track 94 while the locations of the flying pad 14 over an innermost reciprocative access track 96 and in an unlanded position are indicated in phantom. Pivot 34′ and a pivot 40′ join the elements 30′ and the element 32′ to the base of the information storage unit. A pin 38′ rides within a slot 42′ of the element 32′. A pin 48′ on the head mount 26 rides within a slot 44′ of the element 32′. The element 30′ comprises a notched surface 36′. A tension spring 64′ is shown biasing the head mount towards the medium.

FIGS. 3, 4 and 5 are referred to for the operation of the invention. In a retracted or unlanded position, the moving head mount 22 bears against the notched surface 36 of the element 30 as depicted in FIG. 3. The linear motor 16 (not shown in FIGS. 3, 4 or 5) maintains the head mount 22 in a retracted position while the combination of the elements 30, 32 maintains the head mount 26 in a retracted position although the constant force tension spring urges the head mount 26 towards the medium 12. To land the fixed flying pad 18 and moving flying pad 14, the linear motor 16 moves the head mount 22 towards the media thereby allowing a rotation of the element 30 about the pivot 34, a counter rotation of the element 32 about the pivot 40 and a motion of the head mount 26, biased by the spring 64, towards the medium 12. The inclined surface 52 of the arms 24 travel by the ramp element 56 landing the flying pad 18 onto the landing zone 58. The fixed flying pad 18 after being landed continues to move until it reaches the electronically accessible tracks 92. The head mount 26 is limited from further movement towards the medium 12 by the plate 70. The inclined surface 50 of the arm 20 moves past the ramp element 54 landing the flying pad 14 onto the landing zone 58 of the medium 12. After the fixed flying pad 18 has been landed, the moving head mount 22 continues to move towards the medium 12. The moving head mount 22 is independent of the linkage means 28 after the fixed flying pad 18 has been landed and moved to the operative position so that the linear motor 16 experiences merely the load of the moving head mount 22 and the elements coupled thereto. The inclined surface 50 of the arm 20 travels over the ramp element 54, lowering the moving flying pad 14 in the landing zone 58. The linear motor 16 continues to advance the moving flying pad 14 until the flying pad 14 has reached one of the tracks between the outermost reciprocative-access track 94 and the innermost reciprocative-access track 96 as located by the positioning system comprising the lamp 80, the photocell 82 and the reticle 84.

It is desirable to unland the flying pads when the power is to be shut off, in the event of a power failure, in the event of a slow down of the disc or other malfunction. The linear motor pulls on the head mount 22 retracting and unlanding the flying pad 14 as the inclined surface 50 passes over the ramp element 54. The head mount 22 continues to move away from the medium 12 and engages the notched surface 36 of the element 30. The element 30 rotates causing a counter rotation of the element 32 retracting the head mount 26 and causing the inclined surface 52 to pass over the ramp element 56, thereby unlanding the fixed flying pads 18.

Thus an information storage unit is shown which combines advantageous features of both reciprocative flying pad systems and fixed flying pad systems by providing low cost inherent in reciprocative flying pad systems and rapid access of certain information records possible with head-per-track systems. The cost is further reduced and reliability is enhanced by the necessity of only a single linear motor and simple linkage means to control the landing, positioning and unlanding of both a fixed and a moving flying pad.

While the invention has been particularly shown and described with reference to preferred embodiments thereof, it will be understood by those skilled in the art that various changes in form and details may be made without departing from the spirit and scope of the invention.

What is claimed is:

1. In an information storage system in which a medium is movable with respect to a plurality of flying pads, the combination therewith comprising:

first head mount means coupled to a base for positioning a first flying pad means over a first portion of the medium;

second head mount means coupled to the base spatially separated from the first means for positioning a second flying pad means over a second portion of the medium; and means providing a motion relative to the first head mount means for causing a lateral motion of the second head mount means in response to a lateral travel of the first head mount means.

2. The invention as set forth in claim 1 and in which said means providing a motion relative to the first head mount means comprises:

first coupling means pivotally attached to the base for providing a movement in response to a movement of the first head mount means;

second coupling means pivotally attached to the base remote from the location of a pivotal attachment of the first coupling means for causing a motion to the second head mount means in response to the movement of the first coupling means.

3. The invention as set forth in claim 1 and further comprising:

motor means coupled to the first head mount means for imparting a linear motion thereto;

a positioning system coupled to the motor means for causing the motor means to position the first flying pad means over a selected location of the first portion; and wherein the first portion comprises a substantial plurality of concentric data storage tracks; and the second portion comprises at least one data storage track.

4. The invention as set forth in claim 3 and in which:

the means responsive to the first head mount means comprises a first element pivotally mounted to the base for providing a rotational motion in response to a limited travel of the first head mount means and a second element pivotally mounted on the base for imparting a motion to the second head mount means in response to the rotational motion;

biasing means coupled between the base and the second head mount means for urging the second flying pad means towards the second portion; and stop means coupled to the base for limiting the travel of the second flying pad means beyond the second portion.

5. An information storage system comprising:

first flying pad means coupled to a base for communicating with a multi-track operative region of a movable magnetic medium, the first flying pad means movable through the multi-track operative region;

second flying pad means coupled to the base remote from the first flying pad means for communicating with a fixed operative region;

means providing a linear motion for moving the first flying pad means to a landed relationship with the medium; and means responsive to the linear motion including a rotatable linkage operatively coupled between the first and second flying pad means for landing the second flying pad means and moving the second flying pad means over the fixed operative region.

6. The invention as set forth in claim 5 and in which the second flying pad means is advanced with respect to the first flying pad means such that the second flying pad means lands prior to the first flying pad means.

7. The invention as set forth in claim 6 and further comprising:

stop means coupled to the base for limiting the travel of the second flying pad means beyond the fixed operative region; and biasing means coupled between the base and the second flying pad means for urging the second flying pad means towards the fixed operative region.

8. An information storage system in which a plurality of flying pads communicate with a magnetic surface and comprising:

a base;

a first head mount movably coupled to the base and responsive to a linear motor;

a second head mount movably coupled to the base remote from the first head mount;

a first linkage element pivotally attached to the base responsive to a motion of the first head mount;

a second linkage element pivotally attached to the base responsive to the first linkage element for imparting a motion to the second head mount;

a constant force biasing means coupled between the base and the second head mount;

stop means coupled to the base for limiting the travel of the second head mount;

a first arm supporting a first flying pad coupled to the first head mount and having an inclined surface bearing on an element mounted on the base for causing a distance between the flying pad and the magnetic surface to change in relation to lateral travel; and a second arm supporting a second flying pad coupled to the second head mount and having an inclined surface bearing on an element mounted on the base for causing a distance between the associated flying pad and the magnetic surface to change in relation to lateral travel in advance of the change in distance of the flying pad of the first arm.

9. The invention as set forth in claim 8 and in which:

the second head mount is attached to a table having bearing means for slideably coupling the table to the base and in which the stop means comprises an element adjustably coupled to the table and having an eccentric circumferential surface, a travel of which is limited by a plate extending from the base.

* * * * *